Dec. 26, 1961 J. W. LANNERT ETAL 3,014,495
GAS VALVE
Filed March 27, 1958
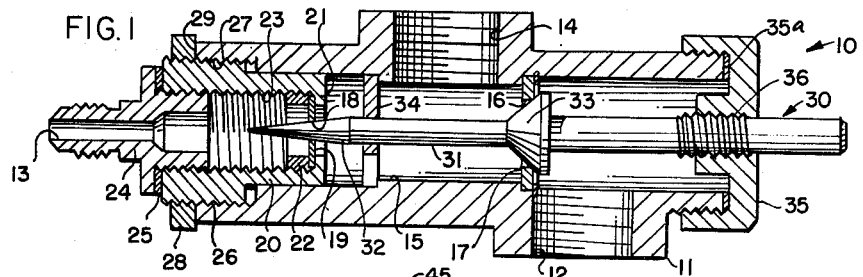
FIG. 1
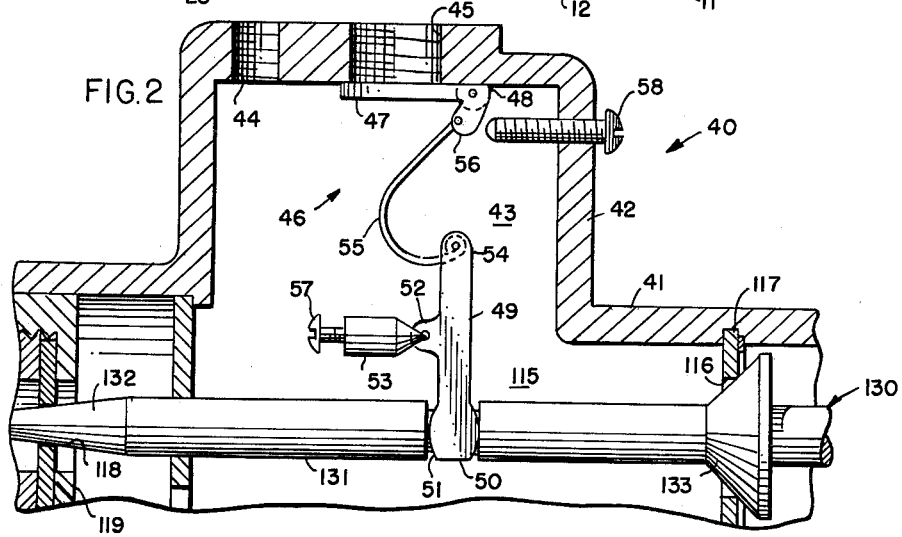
FIG. 2
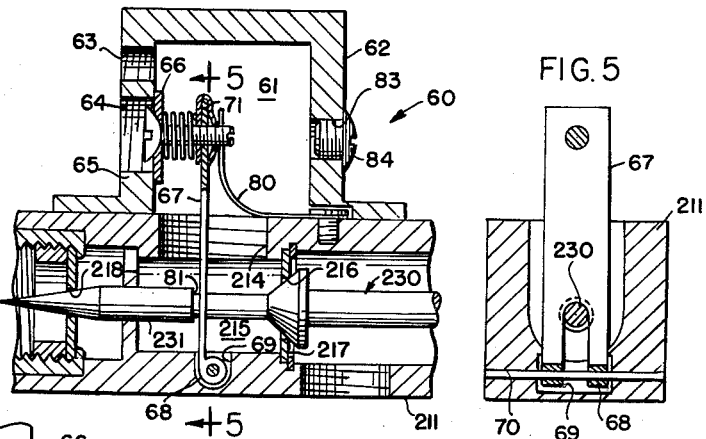
FIG. 3
FIG. 5
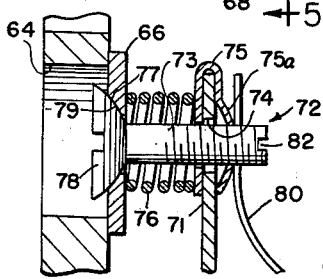
FIG. 4
INVENTORS:
JAMES W. LANNERT
MELVIN H. KORRELL
ROBERT M. WEIR
BY
Schroeder, Hofgren, Brady & Wegner
ATT'YS

United States Patent Office 3,014,495
Patented Dec. 26, 1961

3,014,495
GAS VALVE
James W. Lannert, St. Joseph, and Melvin H. Korrell and Robert M. Weir, Benton Harbor, Mich., assignors to Whirlpool Corporation, a corporation of Delaware
Filed Mar. 27, 1958, Ser. No. 724,286
4 Claims. (Cl. 137—597)

This invention relates to means for controlling the delivery of a fluid such as an air-gas mixture and in particular to such a means arranged to provide an accurate proportioning of the fluids in the mixture.

In providing an air-gas mixture for combustion in a device such as a burner element of a stove, it is desirable to proportion accurately the amount of air mixed with the combustible gas so that an optimum combustion may take place at the burner. In the past, the air and combustible gas have been delivered to a mixing chamber from separate air and gas ducts, in each of which ducts is provided a flow control, or modulating, valve. Between the valves and the mixing chamber, the ducts are further provided with means defining suitable orifices. By properly adjusting the individual valves, the proper proportion of air and combustible gas is delivered through the orifices into the mixing chamber wherein the air and gas are properly mixed and delivered through an outlet to the burner. Where the burner is a "double duty" burner (a burner having a low heat operation and a high heat operation), the mixing chamber is provided with two outlets, one outlet being arranged to deliver the air-gas mixture at a low rate and the other outlet being arranged to provide delivery of the air-gas mixture at an increased rate. Valve means are associated with the latter outlet to open that outlet only when the high heat operation is desired.

The principal feature of this invention is to provide a new and improved means for automatically mixing air with a combustible gas in a predetermined proportion for delivery to a combustion device.

Another feature is that the means comprises a new and improved combined arrangement of flow control valves, orifice defining means, and a mixing chamber.

A further feature is the provision of such a means wherein the movable valve elements coact with the orifices to control the delivery of the air and the gas to the mixing chamber.

Still another feature is that the movable valve elements are carried by a support to be concurrently moved in adjusting the flow passages through the orifices.

Another feature of the invention is that at least one of the orifice defining means is readily replaceable.

A further feature is that means are provided to adjust the relative arrangement of the orifice defining means to assure concurrent closing thereof by the valve means.

Another feature is that the movable valve elements and support define a double needle valve.

Yet another feature of the invention is the provision of such means having a plurality of outlets and new and improved means for controlling delivery of an air-gas mixture from the mixing chamber to the burner.

A still further feature is that the valve member controlling the outlet is operable by means of new and improved mechanism associated with the means carrying the valves controlling the orifices to operate the outlet valve member as a function of the flow passage areas through the orifices.

Yet another feature is that the mechanism is arranged to operate the outlet valve member as a result of only a small movement of the means carrying the inlet valve elements.

A further feature of the invention is that the mechanism includes a spring connection for effecting the desired movement of the outlet valve member by a lever associated with the support of the inlet valve elements.

Yet another feature is that adjustable means are provided to effect accurate coordination of the operation of the valve of the outlet valve member with a predetermined amount of movement of the support of the inlet valve elements.

Other features and advantages of this invention will be apparent from the following description taken in connection with the accompanying drawings, wherein:

FIGURE 1 is a longitudinal section of a means for controlling the delivery of a fluid mixture, embodying the invention.

FIGURE 2 is a fragmentary longitudinal section of a modified form of such means, including means for controlling flow through an outlet.

FIGURE 3 is a fragmentary longitudinal section of still another modified form thereof, including means for controlling an outlet thereof.

FIGURE 4 is a fragmentary enlarged longitudinal section.

FIGURE 5 is a transverse section taken approximately along the line 5—5 of FIGURE 3.

In the exemplary embodiment of the invention, as disclosed in FIGURE 1, a means for controlling the delivery of a fluid mixture comprises a mixing valve 10 having a body 11 provided with an air inlet 12, a combustible gas inlet 13 and an outlet 14. Between the inlets and the outlet, body 11 is provided with a hollow defining a mixing chamber 15, communication between air inlet 12 and mixing chamber 15 being through an air orifice 16 in a first orifice plate 17, the communication between gas inlet 13 and mixing chamber 15 being through a gas orifice 18 in a second orifice plate 19. Air and combustible gas, under suitable pressures, are delivered through inlets 12 and 13, respectively, to pass through the orifices 16 and 18, respectively, into mixing chamber 15 where the air and gas are thoroughly mixed to be delivered through outlet 14 to a suitable combustion device such as a burner (not shown).

To provide a proper combustion of the combustible gas, it is necessary to mix the air therewith in chamber 15 in an accurately maintained ratio. The desired proportion of air to combustible gas in the mixture may be readily controlled by properly proportioning air orifice 16 relative to gas orifice 18. Because the different types of combustible gas differ in their heat producing abilities, it is desirable to permit the ready installation of a plate 19 having a proper size orifice 18 corresponding to the combustible gas being utilized. For this purpose, gas orifice plate 19 is mounted in body 11 by means of a sleeve 20 having inturned flange 21 at the inner end thereof against which orifice plate 19 is retained by means of an externally threaded retaining ring 22 in an internally threaded bore portion 23 of the sleeve. Threaded into the outer end of the bore 23 is a conventional gas inlet member 24 which may be sealed to the sleeve by means of an annular gasket 25.

Sleeve 20 is axially adjustably secured to body 11 by means of an exteriorly threaded portion 26 in engagement with an interiorly threaded recess 27 in the body 11. To lock sleeve 20 against axial movement, when desired, a locking ring 28 is threaded onto threaded portion 26 of the sleeve to abut an end wall surface 29 of the body.

To vary the amount of the air-gas mixture delivered from valve 10, means are provided for varying the effective flow passage areas through orifices 16 and 18. This means herein comprises a double needle valve 30 comprising a rod support 31 having a frusto-conically tapered inner end 32 defining a movable valve element co-operating with gas orifice plate 19 to control gas orifice 18, and a frusto-conical flange 33 co-operating with orifice plate 17 to control air orifice 16. Support 31 is maintained coaxially of aligned orifices 16 and 18 by means of a guide 34 in mixing chamber 15 and a cap 35 threadedly secured to one end of the body. A seal ring 35A seals cap 35 to body 11. Support 31 is threaded through cap 35 at mid-portion 36 so that the support is movable axially of orifices 16 and 18 as a result of rotation thereof in the cap. This can be effected by direct manipulation or by means of a handle (not shown) on the outer end of member 30.

Thus, needle valve elements 32 and 33 may be moved alternatively inwardly to a closed position, as seen in FIG. 1, wherein orifices 16 and 18 are blocked, and outwardly (to the right of the closed position as seen in FIG. 1) to open the orifices 16 and 18, as desired. The respective tapers of the frusto-conical valve elements 32 and 33 are co-ordinated with the diameters of the corresponding orifices 16 and 18 so that a definite proportion of the respective flow passage areas is maintained between the closed position of the needle valve and the fully open position thereof, thus the proper proportion of air to combustible gas is maintained for all output deliveries through outlet 14.

When it is desired to utilize valve 10 with a combustible gas other than that for which it was originally arranged, it is only necessary to remove the original gas orifice plate and replace it with a gas orifice plate having the proper orifice size to provide the proper proportion of combustible gas to air in mixing chamber 15. To assure the proper installation of the orifice plate 19, member 30 is manipulated to move valve element 33 into closed relationship with air orifice 16. With gas orifice plate 19 secured in place against flange 21 by retaining ring 22, sleeve 20 is threaded into body threaded poriton 27 until such threaded movement is arrested by engagement of orifice plate 19 with valve element 32 indicating that the flow passage opening 18 has been fully closed by the valve element. Locking ring 28 is then threaded over sleeve portion 26 into abutment with body end 29 to secure the sleeve in this position. Concurrent opening of orifices 16 and 18, as previously described, will maintain the new proportion of the combustible gas with the air for all outputs through outlet 14.

In FIG. 2 is shown a modified form of valve 40 which is generally similar to valve 10 except that new and improved means are provided for controlling the delivery of the mixed combustible gas and air from the mixing chamber. To simplify the description of valve 40, all elements thereof identical to corresponding elements of valve 10 will be identified by corresponding numerals 100 higher.

Valve 40 comprises a modified body 41 which is provided with an enlargement 42 enclosing a space 43 opening into the mixing chamber 115. A needle valve 130 controls an air orifice 116 and a gas orifice 118 to maintain the proportion of air to combustible gas in the mixing chamber as described above relative to valve 10.

Enlargement 42 is provided with a first outlet 44 and a second outlet 45. Outlet 44 is relatively small in cross section and may be used to conduct the gas-air mixture from body 41 to effect a simmer operation of a burner device. Outlet 45 is relatively larger in cross section and permits a relatively larger rate of flow of gas-air mixture from body 41 to effect a main operation of a burner device. Outlet 44 is allowed to remain open at all times, while valve means 46 is provided to close outlet 45 other than when a main burner operation is desired. Valve means 46 is arranged to control outlet 45 as a function of the position of rod support 131 of the needle valve and is mechanically controlled thereby. Thus, a positive relationship is established between the amount of opening of orifices 116 and 118 and the point at which outlet 45 is opened.

More specifically, means 46 comprises a valve member or closure 47 pivotally mounted on a projection 48 extending into the interior 43 of the enlargement at one side of outlet 45. A lever 49 is connected at one end 50 to a reduced diameter portion 51 of rod support 131 for axially fixed, rotatable association therewith. The lever is pivotally mounted at a mid-portion 52 on an adjustable support 53 to swing an outer end 54 of the lever about portion 52 as a result of movement of the end 50 with rod support 131 when the rod support is moved to adjust the position of valve elements 132 and 133 thereon. A spring connector 55 is connected between outer end 54 of the lever and an ear 56 on closure 47 to pivot the closure to a closed position across outlet 45 whenever needle valve 130 is adjusted to deliver a volume of gas-air mixture less than that proper for a main burner operation. However, when the needle valve 130 is operated (moved to the right as seen in FIG. 2) to open orifices 116 and 118 sufficiently to provide a quantity of gas-air mixture proper for a main burner operation, outer end 54 of lever 49 is swung sufficiently (in a counterclockwise direction as seen in FIG. 2) to cause spring connector 55 to snap closure 47 pivotally away from its closed position across outlet 45. The air-gas mixture may then flow through outlet 45 to effect a main burner operation. Adjustment of support 53 is effected through a suitable screw means 57 associated therewtih to assure that this snap opening occurs accurately at the point of movement of rod support 131 wherein the valve elements 132 and 133 permit the minimum rate of flow of the gas and air to effect a proper main burner operation. An adjustable stop 58 limits the pivotal movement of closure 47 and assures the restoration of the spring connector 55 to the position of FIG. 2 when the needle valve is reclosed.

Thus, the adjustment of needle valve 130 to control the amount of gas and air delivered to mixing chamber 115 also automatically controls the opening and closing of main outlet 45 so that the gas-air mixture may be delivered therethrough only when a sufficient quantity of the mixture is being delivered by the needle valve to provide proper main burner operation.

In FIG. 3 is shown still another modified form of valve 60 in which a modified means for controlling the main outlet is provided. To simplify the description, all valve elements similar to those of valve 10 are designated by numerals 200 higher.

Valve 60 comprises a body 211 defining a mixing chamber 215 into which air and combustible gas are delivered through suitable orifices 216 and 218, respectively. A needle valve 230 is provided for controlling the delivery of the air and the gas to the mixing chamber. The air-gas mixture is delivered from mixing chamber 215 through outlet 214 into a space 61 defined by an enclosure 62 on body 211. A first outlet 63 and a second larger outlet 64 are provided in a side wall 65 to open outwardly from body 211 parallel to the axis of the needle valve. As discussed relative to valve 40, the smaller outlet 63 may be utilized to provide gas-air mixture for a simmer operation in a burner device, and the larger outlet 64 may be utilized to provide gas-air mixture for a main burner operation. To maintain the main outlet 64 closed until such time as sufficient air-gas mixture are delivered through needle valve 230 to effect a proper main burner operation, a valve 66 is provided. Valve 66 is operated by a lever 67 pivotally mounted at one end 68 in a recess 69 of body 211 by a pin 70 secured to the body to extend transversely through the recess.

As best seen in FIG. 4, valve 66 is associated with the opposite or outer end 71 of lever 67 by means of a stud 72 having a threaded shank 73 extending through an opening 74 in lever end 71 and through a clip 75 installed over lever end 71. A coil spring 76 is disposed under compression between clip 75 and valve means 66 to urge the closure against a spherical surface 77 on the head 78 of stud 72, which head extends somewhat into main outlet 64 in the valve closed position. The surface 79 of valve 66, which engages surface 77 of the stud head, is complementarily spherical, and thus valve 66 may be seated properly across outlet 64 notwithstanding some axial disalignment of the stud.

Adjustment of the position of stud 72 relative to lever end 71 is effected by threading the stud through a bowed connector portion 75a of clip 75. A spring 80 is secured at one end to body 211 and bears yieldingly against bowed portion 75a. Spring 80 biases stud 72 to the left, as seen in FIG. 4, to urge valve 66 into a closed position across outlet 64.

Lever 67 is operated by needle valve 230 to move stud 72 in opposition to the biasing action of spring 80 when the needle valve has opened orifices 216 and 218 sufficiently to deliver a quantity of combustible gas and air proper for a main burner operation. For this purpose, the rod support 231 of the needle valve is provided with a shoulder 81 which, when the needle valve is in the closed position, has a slight clearance with lever 67 permitting spring 80 to effect the seating of valve 66 across outlet 64. However, when the needle valve is opened (moved to the right as seen in FIG. 3) sufficiently to deliver the proper quantity of gas and air for a main burner operation, shoulder 81 abuts lever 67 and urges outer end 71 thereof away from side wall 65 (effects a clockwise rotation of lever 67 about pivot pin 70, as seen in FIG. 3) to open outlet 64. To adjust the axial position of stud 72 to seat valve 66 properly on stud head 78 when the closure is in the closed position, a slot 82 is provided in the outer end of the stud shank 73 and an opening 83 is provided in enclosure 62 in alignment with the stud to permit the introduction of a suitable tool, such as a screwdriver, through the opening to engage slot 82 and permit desired manipulation of the stud. A screw 84 is threaded into opening 83 to close sealingly the opening other than when adjustment of stud 72 is being effected.

As the abutment of shoulder 81 with lever 67 is relatively close to the pivotal end 68 thereof, a rapid movement of the outer end 71 is effected once shoulder 81 engages the lever. Thus, outlet 64 is quickly opened, whereby control of the rate of flow of the gas-air mixture through outlet 64 is effected primarily by the adjustment of the openings through orifices 216 and 218 rather than by the valve member 66.

While we have shown and described certain embodiments of our invention, it is to be understood that it is capable of many modifications. Changes, therefore, in the construction and arrangement may be made without departing from the spirit and scope of the invention as defined in the appended claims.

We claim:

1. Fluid delivery control means, comprising: a body having a hollow defining a mixing chamber, first and second inlets to the mixing chamber, first and second outlets from the mixing chamber; means defining first and second orifices in the first and second inlets respectively; valve means adjacent each of said orifices; means adjusting the disposition of each valve means for varying concurrently the flow rate through each of said orifices up to a predetermined maximum; a valve member for opening and closing one of said outlets; and means interconnecting said valve member and said valve means moving said valve member to open said one outlet whenever said valve means are disposed to provide a flow rate greater than a predetermined rate that is less than said maximum.

2. Fluid delivery control means, comprising: a body having a hollow defining a mixing chamber, first and second inlets to the mixing chamber, first and second outlets from the mixing chamber; means defining a first orifice controlling flow through the first inlet; means defining a second orifice controlling flow through the second inlet; a rigid support extending movably to adjacent each of said orifices; valve means on said support for movement therewith to vary concurrently the flow rate through each of said orifices up to a predetermined maximum rate of flow; a valve member for controlling the second outlet; and means operably connecting the valve member and support to open the second outlet whenever said support is moved to dispose said valve means to make the flow rate through both said orifices greater than a predetermined rate that is less than said maximum rate.

3. Fluid delivery control means, comprising: a body having a hollow; an inlet to the hollow, first and second outlets from the hollow through which fluid flows when both outlets are open; means for varying the flow rate through said inlet up to a predetermined maximum rate; a valve member controlling the second outlet; and means operated by the flow varying means to position the valve member so as to open the second outlet whenever said flow varying means are arranged to make said flow rate through said inlet greater than a predetermined rate that is less than said predetermined maximum, said means operated by the flow varying means including an adjustable means for positioning the valve member so as to open the second outlet whenever said flow varying means are arranged to make said flow rate greater than any one of a plurality of predetermined rates.

4. Fluid delivery control means, comprising: a body having a hollow; an inlet to the hollow, first and second outlets from the hollow through which fluid flows when both outlets are open; means for varying the flow rate through said inlet up to a predetermined maximum rate; a valve member controlling the second outlet; and means operated by the flow varying means to position the valve member so as to open the second outlet whenever said flow varying means are arranged to make said flow rate through said inlet greater than a predetermined rate that is less than said predetermined maximum, said means operated by the flow varying means including a spring biasing the valve member to close said second outlet whenever the flow rate is less than said predetermined rate.

References Cited in the file of this patent

UNITED STATES PATENTS

| | | |
|---|---|---|
| 816,517 | Whalen | Mar. 27, 1906 |
| 1,155,915 | Grove | Oct. 5, 1915 |
| 1,402,718 | Armstrong | Jan. 3, 1922 |
| 2,193,270 | Coleman | Mar. 12, 1940 |
| 2,519,158 | Symmons | Aug. 15, 1950 |
| 2,560,090 | Crow | July 10, 1951 |
| 2,623,533 | Spicer | Dec. 30, 1952 |
| 2,867,422 | Brunner | Jan. 6, 1959 |